United States Patent
Cormie et al.

(10) Patent No.: US 12,101,518 B2
(45) Date of Patent: *Sep. 24, 2024

(54) METHOD AND SYSTEM FOR RE-UNITING METADATA WITH MEDIA-STREAM CONTENT AT A MEDIA CLIENT, TO FACILITATE ACTION BY THE MEDIA CLIENT

(71) Applicant: ROKU, INC., San Jose, CA (US)

(72) Inventors: Steven M. Cormie, Cambridge (GB); Brian Jentz, Buxton (GB)

(73) Assignee: ROKU, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,650

(22) Filed: May 15, 2023

(65) Prior Publication Data

US 2023/0403416 A1  Dec. 14, 2023

Related U.S. Application Data

(63) Continuation of application No. 17/447,711, filed on Sep. 15, 2021, now Pat. No. 11,689,751, which is a (Continued)

(51) Int. Cl.
*H04N 21/235* (2011.01)
*H04N 21/234* (2011.01)
(Continued)

(52) U.S. Cl.
CPC ..... *H04N 21/235* (2013.01); *H04N 21/23424* (2013.01); *H04N 21/23892* (2013.01);
(Continued)

(58) Field of Classification Search
CPC ........... H04N 21/235; H04N 21/23424; H04N 21/23892; H04N 21/812; H04N 21/83; H04N 21/8358

See application file for complete search history.

(56) References Cited

U.S. PATENT DOCUMENTS 9,106,964 B2  8/2015  Zhao
9,704,016 B2  7/2017  Jang et al.
(Continued)

FOREIGN PATENT DOCUMENTS

WO   WO 2012/010767 A2   1/2012

OTHER PUBLICATIONS

International Search Report and Written Opinion of the International Searching Authority directed to International Patent Application No. PCT/US2020/049362, dated Dec. 17, 2020; 10 pages.

*Primary Examiner* — Kyu Chae

(74) *Attorney, Agent, or Firm* — Sterne, Kessler, Goldstein & Fox P.L.L.C

(57) ABSTRACT

In a communication system where a channel teed carrying a media stream is broadcast for delivery of the media stream to a media client, where the channel feed further includes metadata in-band and correlated with a content frame of the media stream, but where the metadata gets removed from the channel feed before the media stream reaches the media client, a computing system (i) extracts the metadata from the channel feed and (ii) transmits out-of-band to the media client the extracted metadata in correlation with reference fingerprint data representing the frame of the media stream, the correlation being useable by the media client as a basis to re-correlate the metadata with the frame of the media stream, so as to enable the media client to carry out an action, such as dynamic ad insertion, based on the correlation of the metadata with the frame of the media stream.

20 Claims, 6 Drawing Sheets

Related U.S. Application Data continuation of application No. 15/929,211, filed on Jan. 28, 2020, now Pat. No. 11,153,616.

(60) Provisional application No. 62/900,043, filed on Sep. 13, 2019.

(51) Int. Cl.
  *H04N 21/2389* (2011.01)
  *H04N 21/81* (2011.01)
  *H04N 21/83* (2011.01)
  *H04N 21/8358* (2011.01)

(52) U.S. Cl.
  CPC ........... *H04N 21/812* (2013.01); *H04N 21/83* (2013.01); *H04N 21/8358* (2013.01)

(56) References Cited

U.S. PATENT DOCUMENTS

| | | | |
|---|---|---|---|
| 9,756,381 B2 | 9/2017 | Oh et al. | |
| 11,153,616 B2* | 10/2021 | Cormie | H04N 21/83 |
| 11,689,751 B2* | 6/2023 | Cormie | H04N 21/23424 |
| | | | 725/32 |
| 2004/0017831 A1* | 1/2004 | Shen | H04N 21/2362 |
| | | | 370/537 |
| 2006/0133644 A1 | 6/2006 | Wells et al. | |
| 2009/0213270 A1* | 8/2009 | Ismert | G06F 16/7847 |
| | | | 348/575 |
| 2011/0225606 A1* | 9/2011 | Williams | H04N 21/8405 |
| | | | 725/28 |
| 2014/0033250 A1* | 1/2014 | Kennedy | H04N 21/812 |
| | | | 725/32 |
| 2014/0196085 A1* | 7/2014 | Dunker | H04N 21/812 |
| | | | 725/36 |
| 2015/0334459 A1 | 11/2015 | Oh et al. | |
| 2015/0339304 A1* | 11/2015 | Laksono | H04N 21/854 |
| | | | 707/769 |
| 2016/0057317 A1* | 2/2016 | Zhao | H04N 21/8358 |
| | | | 348/515 |
| 2017/0208220 A1* | 7/2017 | Stankoski | H04N 5/0736 |
| 2019/0058929 A1* | 2/2019 | Young | H04N 21/235 |
| 2021/0084345 A1 | 3/2021 | Cormie et al. | |
| 2021/0409788 A1 | 12/2021 | Cormie et al. | |

* cited by examiner

METHOD AND SYSTEM FOR RE-UNITING METADATA WITH MEDIA-STREAM CONTENT AT A MEDIA CLIENT, TO FACILITATE ACTION BY THE MEDIA CLIENT

REFERENCE TO RELATED APPLICATION

This application claims priority to U.S. non-provisional patent application Ser. No. 17/447,711, filed Sep. 15, 2021, which claims priority to U.S. non-provisional patent application Ser. No. 15/929,211, filed Jan. 28, 2020, which claims priority to U.S. Provisional Patent Application No. 62/900,043, filed Sep. 13, 2019, the entirety of each of which is hereby incorporated by reference.

BACKGROUND

A typical media client operates to receive an analog or digital media stream representing media content such as video and/or audio content and to process the media stream for presentation by the media client or an associated entity on a user interface such as a display screen and/or an audio speaker. Examples of such media clients could include televisions, computer monitors, projection systems, loudspeakers, headphones, set top boxes (e.g. cable or satellite TV receivers), digital video recorders, radios, personal computers, mobile communication devices, gaming consoles, streaming media players, and/or combinations of these other devices.

By way of example, a television could receive a broadcast stream (e.g., over the air, from a set top box, through an Internet connection, or in another manner) and could present the media content of that broadcast stream to a user. As another example, a set top box could receive a broadcast stream from a Multi-channel Video Program Distributor (MVPD) and could output the media content of that stream via a. High-Definition Multimedia. Interface (HDMI) cable or other interface to a television and/or audio/video receiver for playout. As still another example, a digital video or audio recorder could likewise receive a broadcast stream but could store the broadcast stream for later playout. And as yet another example a loudspeaker or headphones could receive a broadcast audio stream from a radio, computer, or other device, and could present the audio content of that stream to a user. Numerous other examples are possible as well.

SUMMARY

The present disclosure provides a technical advance that could help to address a situation in which a channel feed carrying a media stream is broadcast for delivery of the media stream to a media client, where the channel teed further includes metadata in-band and correlated with a content frame of the media stream, but where the metadata gets removed from the channel feed before the media stream reaches the media client.

In accordance with the disclosure, a computing system could extract the metadata from the channel feed and could then transmit in an out-of-band message to the media client the extracted metadata in correlation with reference fingerprint data representing the frame of the media stream. The correlation of the extracted metadata with the reference fingerprint data representing the frame of the media stream could then be useable by the media client as a basis to re-correlate the metadata with the frame of the media stream, so as to enable the media client to carry out an action based on the correlation of the metadata with the frame of the media stream.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
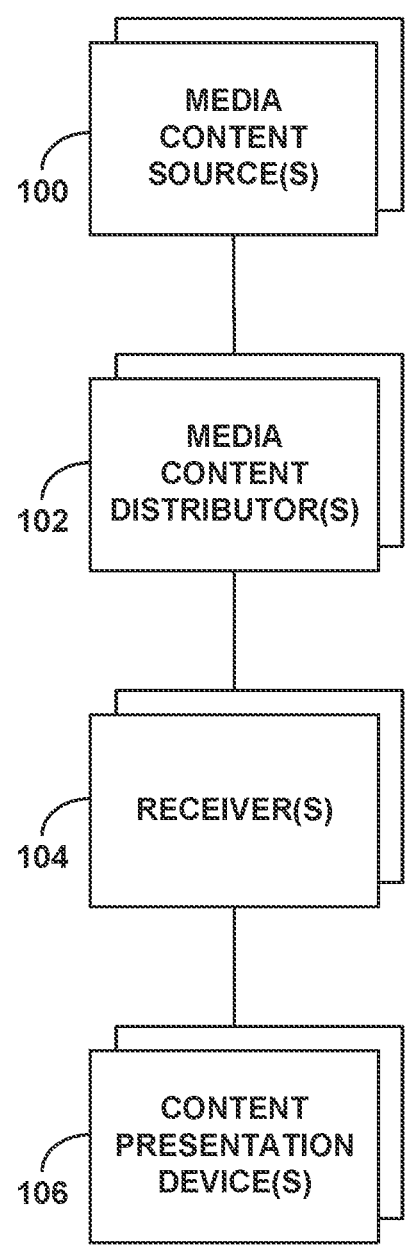
FIG. 1 is a simplified block diagram of an example system in which various disclosed principles can be applied.

Referring to the drawings, as noted above, FIG. 1 is a simplified block diagram of an example system in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that functions described herein as being carried out by one or more entities could be implemented by and/or on behalf of those entities, through hardware, firmware, and/or software, such as by one or more processing units executing program instructions or the like.

As shown in FIG. 1, the example system includes one or more media content sources 100 (e.g., broadcasters, web servers, etc.), one or more media content distributors 102 (e.g., MVPDs, such as cable providers, satellite providers, over-the-air broadcast providers, web aggregators, etc.), one or more media content receivers 104 (e.g., cable receivers, satellite receivers, over-the-air broadcast receivers, computers or other streaming media receivers, etc.), and one or more clients or content presentation devices 106 (e.g., TVs or other display devices, loudspeakers or other audio output devices, etc.)

In an example implementation, the media content sources 100 could be national broadcasters, such as ABC, NBC, CBS, FOX, HBO, and CNN, the media content distributors 102 could be local affiliates and/or other local content distributors in designated market areas (MIAs), and the receivers 104 and content presentation devices 18 could then be situated at customer premises, such as homes or business establishments. With this or other arrangements, the content sources 100 could deliver media content to the content distributors 102 for distribution to receivers 104 at customer premises, and the content distributors could distribute the media content to the receivers 104 on discrete channels (e.g., particular frequencies or other defined channels). Each receiver could then respond to user input or one or more other triggers by tuning to a selected channel and outputting to a content presentation device 106 the media content that is arriving on the selected channel. And the content presentation device 106 could receive and render the media content (e.g., display or otherwise present the content).

When a media client such as a receiver 104 and/or content presentation device 106 is processing a linear media stream for presentation (e.g., as the media client is receiving the media stream, rendering the media stream for presentation, outputting the media stream for presentation, and/or otherwise processing the media stream for presentation), it may be useful in certain situations for the media client to perform a special content-related action, i.e., an action related to the content of the media stream.

By way of example, the content-related action could involve initiating an interactive event, such as beginning to superimpose overlay content (e.g., overlay audio and/or video content) that prompts a user to respond in some manner or that otherwise relates to interaction with a user of the media client or of an associated user interface on which content of the media stream is presented.

And as another example, the content-related action could involve dynamically revising a portion of the stream's media content. For example, it may be useful for the media client to dynamically replace an ad or other replaceable segment of the media stream with a replacement ad or with other replacement content, so that when the content is played out to a user, the user would receive the replacement ad or other replacement content in place of the originally included ad or other replaceable segment. As another example, it may be useful for the media client to dynamically supplement a portion of the media content with overlay or split-screen content, such as channel identification, context information, ad content, or the like, so that when the content is being played out to a user, the user would receive the supplemental content together with the originally included content.

Further, it may be desirable for the media client to perform the content-related action at a specific time point within the media stream. For instance, if the media client is to dynamically replace an existing ad or other replaceable segment of the media stream with a replacement ad or other replacement content, it may be desirable for the media client to position the replacement ad or other replacement content at a time in the media stream when the existing ad or other replaceable segment would have started. Likewise, if the media client is to supplement a specific portion of the media content with an overlay related to that portion, it may be desirable for the media client to start the overlay when that portion starts. Other examples are possible as well.

More particularly, the media stream at issue could define a sequence of frames, such as video frames and/or audio frames, and it may be desirable for the media client to perform the content-related action on a frame-accurate basis. For instance, for dynamic content replacement, it may be desirable for the media client to insert the replacement ad or other replacement content in place of the existing ad or other replaceable segment starting precisely at the first frame of the existing ad or other replaceable segment. And for adding an overlay to a specific portion of the media stream, it may be desirable for the media client to start the overlay at or in specific relation to the first frame of that portion of the media stream. Similar rationale may exist for other of content-related actions as well.

To facilitate this, an entity that provides the media stream could include in-band with the media stream certain metadata related to the upcoming content-related-action opportunity, such as metadata specifying timing of the upcoming content-related action and/or metadata characterizing the type of content-related action to perform, among other possibilities. When the media client receives the media stream together with such metadata, the media client could then use the metadata as a basis to carry out the content-related action.

This metadata could be included in-band with the media stream in various ways, and the media client could accordingly extract the in-band metadata in various ways to facilitate use of the metadata for carrying out the content-related action. Including the metadata in-band with the media stream involves providing the metadata with the media stream, such as in the same communication as the media stream, so that the metadata would be received with the media stream. This is to be distinguished from providing the metadata out-of-band, where the metadata is provided separately from the media stream, such as in a separate communication, possibly through a different communication channel, for instance.

One way to provide metadata in-band with a media stream is to encode the metadata into the media stream itself. For instance, the metadata could be steganographically encoded as watermarking (e.g., one or more audio or video watermarks) in content of the media stream, using any of various watermarking techniques now known or later developed. In that case, the media client could evaluate the incoming media stream to detect the presence of such a watermark and, upon detecting the watermark, could decode the watermark and thus read the metadata from the media stream. Alternatively, the metadata could be otherwise encoded in the media stream, such as within a vertical ancillary data (VANC) space of a video frame for instance, in which case the media client could read the metadata from the VANC, space of the video frame, among other possibilities.

And as another example, if the media stream is carried in a transport stream (e.g., in a packet-data stream), then the transport stream might carry the metadata within the header of each of headers of one or more transport-stream packets and/or within one or more special packets of the transport stream. In that case, the media client could evaluate the incoming transport stream carrying the media stream to detect the presence of the metadata at the transport-stream layer and could then read the metadata from the transport stream.

These or other forms of in-band metadata could be provided using various protocols, such as but not limited to those defined by standards organizations such as the Society of Cable and Telecommunications Engineers (SCTE) (e.g., SCTE 104 or SCTE 35), the Advanced Television Systems Committee (ATSC) ATSC 3.0), or the European Telecommunications Standards Institute (e.g., Hybrid Broadcast Broadband (HBB) TV (IS 102 796)), among other possibilities.

As is known in the art, for instance, watermarking involves permanently embedding or otherwise encoding information into media content in a manner that enables the information to be decoded and extracted from the media content by a receiver of the media content but that may be imperceptible to a user to whom the media content is presented. This is in contrast to inserting such information into a packet header or the like without encoding the information into the underlying media content itself. Watermarking permanently changes the media content and may be impossible to remove.

More particularly, watermarking media content could involve encoding into the media content a code that can be mapped to associated information, or perhaps more directly encoding into the media content the associated information. In an example implementation, the watermark code could be on the order of 24 bits, and the watermarking could be done in an audio component of the media content and/or in a video component of the media content, depending on the form of the media content for instance.

Existing audio watermarking techniques include, without limitation, inserting audio energy into the audio signal or otherwise adjusting one or more characteristics of the audio signal in a manner that can be detected by a suitably configured watermark-detection algorithm but that is masked from hearing (e.g., the audio characteristic and/or manner of encoding being sufficient to hide the watermark from human detection)—known as stenographic or psycho-acoustic encoding.

Examples of audio watermarks and corresponding watermark detection techniques are described in U.S. Pat. No. 8,359,205 (entitled "Methods and Apparatus to Perform Audio Watermarking and Watermark Detection and Extraction," which issued on Jan. 22, 2013), U.S. Pat. No. 8,369,972 (entitled "Methods and Apparatus to Perform Audio Watermarking Detection and Extraction," which issued on Feb. 5, 2013), U.S. Patent Application Pub. No. 2010/0223062 (entitled "Methods and Apparatus to Perform Audio Watermarking and Watermark Detection and Extraction," which was published on Sep. 2, 2010), U.S. Pat. No. 6,871,180 (entitled "Decoding of Information in Audio Signals," which issued on Mar. 22, 2005), U.S. Pat. No. 5,764,763 (entitled "Apparatus and Methods for including Codes in Audio Signals and Decoding," which issued on Jun. 9, 1998), U.S. Pat. No. 5,574,962 (entitled "Method and Apparatus for Automatically identifying a. Program Including a Sound Signal," which issued on Nov. 12, 1996), U.S. Pat. No. 5,581,800 (entitled "Method and Apparatus for Automatically Identifying a Program including a Sound Signal," which issued on Dec. 3, 1996), U.S. Pat. No. 5,787,334 (entitled "Method and Apparatus for Automatically Identifying a Program Including a Sound Signal," which issued on Jul. 28, 1998), and U.S. Pat. No. 5,450,490 (entitled "Apparatus and Methods for Including Codes in Audio Signals and Decoding," which issued on Sep. 12, 1995, all of which are hereby incorporated by reference in their entireties.

Existing video watermarking techniques, on the other hand, involve embedding a code in a video component of the media content in a manner that can be detected by a suitably configured watermark-detection algorithm but that is masked from human visual detection.

Examples of video watermarking techniques include various spatial-domain techniques such as flipping pixels, embedding the watermark into least significant bits, and adding a pseudo-random noise pattern to the video, and various frequency-domain techniques, such as SVD domain watermarking, Discrete Fourier Transform watermarking, Discrete Cosine Transform watermarking, Discrete Wavelet Transform watermarking, and principal component analysis watermarking. Other examples are possible as well.

Metadata provided in-band using these or other techniques could be provided with the media stream in a manner that correlates the metadata with an associated point in the media stream, such as a particular frame among the sequence of frames defining the media stream. By way of example, the metadata could be watermarked in a specific frame of the media stream to correlate the metadata with that specific frame. Or the metadata might be provided in a transport packet carrying or adjacent in sequence to a specific frame of the media stream to correlate the metadata with that specific frame. Alternatively, the in-band metadata might be correlated with a particular frame or other portion of the media stream in another manner.

With this or a similar arrangement, the in-band metadata could provide the media client with various useful information to enable the media client to carry out a content-related action.

By way of example, if the content-related action is dynamic ad insertion (DAI), where the media client would replace playout of a replaceable ad in the media stream with playout of a replacement ad (such as one tailored to user demographics), the metadata could provide information that informs the media client when in the media stream the replaceable ad starts, so that the media client could start inserting the replacement ad at the frame-accurate point during the media client's processing of the media stream. For instance, the metadata could simply be an advertisement identifier (Ad-ID) provided in-band in correlation with at least one or more starting frames of the replaceable ad, so that the media client could detect the in-band metadata as an indication of the frame where the media client should start inserting the replacement ad.

As another example, the in-band metadata provided in correlation with a particular frame or other time point in the media stream could specify a time delta that informs the media client how far ahead from that point in the media stream the media client should start performing the content-related action. For instance, the in-band metadata provided in correlation with a particular frame of the media stream might direct the media client to insert a replacement ad starting N frames later than that particular frame or N milliseconds later than that particular frame, among other possibilities.

As still another example, the in-band metadata could cause the media client to carry out any of a variety of other content-related actions, such as to apply a graphical overlay to the content of the media stream, and/or to initiate presentation of a specified application such as an interactive program, presentation of e-commerce: related opportunities possibly including product placement, offers of coupons, and/or presentation of personalized content recommendations such as content similar to the content being presented, among other possibilities.

One technical problem that can occur with use of this or other such in-band metadata is that the in-band metadata might be stripped or otherwise dropped when the media stream is en route to the media client, so the media client may receive the media stream without receiving the metadata and may therefore not carry out the associated content-related action.

By way of example, as a media stream with the in-band metadata is being communicated along a media-distribution path en route to the client, an entity within the media-distribution path might receive the media stream and the metadata, and that entity might strip the metadata and forward the media stream without the metadata along the media-distribution path for ultimate receipt by the media client.

For instance, in an implementation where the media client is a content presentation device such as a TV, a customer-premises receiver upstream from the media client might receive from an MVPD or other entity a transport stream that carries a media stream representing a channel of content and that also carries metadata. As the receiver receives that transport stream, the receiver may extract the media stream from the transport stream (e.g., de-packetize the media stream) and output the extracted media stream through HDMI or another interface to the media client for presentation. But in this process, the receiver may not forward to the media client the metadata that was also included in the transport stream. Therefore, the media client may not receive the metadata that was included in the transport stream and so may be unable to carry out a content-related action based on that metadata.

As another example, an entity within the media-distribution path might receive the transport stream that carries the media stream with the metadata and might strip the metadata from the transport stream before forwarding the transport stream along the media-distribution path, so that a downstream entity receiving the media stream would likewise not receive the metadata that was carried by the transport stream.

For instance, the SCTE 35 standard provides for inclusion in a transport stream of splice_information packets that specify when dynamic content modification should occur in the media stream carried by the transport stream. However, industry practice in accordance with the SCTE 35 standard suggests that a content distributor (e.g., a terrestrial over-the-air broadcaster, or a satellite or cable MVPD) should strip any splice_information packets from a transport stream before delivering the transport stream to customer premises equipment, in order to prevent unauthorized "commercial killers" or the like. In particular, the industry concern is that an unauthorized party could detect the presence of splice_information packets and could undesirably remove (e.g., skip past) or replace included commercials in the media stream. Although splice_information packets could be secured through scrambling and/or encryption, the packets may still be sent separately within the transport stream, and there is a risk that they could be detected and used without authorization. Consequently, it may not be feasible or practical to maintain splice_information packets in a transport stream en route to an end-user media client, and so the end-user media client may be unable to use that in-band metadata as a basis to carry out dynamic content modification.

Further, similar loss of in-band metadata could occur with respect to other types of in-band metadata, such as metadata provided in the VANC space or through watermarking, among other possibilities.

Considering this technical issue, at issue is then how to convey to the media client the metadata that was included in-band with the media stream, and particularly how to convey that metadata to the media client in a manner that would properly correlate or otherwise reunite the metadata with the frame or other portion of the media stream that the metadata was correlated with in the first place.

In accordance with the present disclosure, a computing system will extract the metadata that is included in-band with the media stream en route to the media client and will then transmit the extracted metadata out-of-band to the media client in a manner that enables the media client to correlate the metadata with the particular frame or other portion of the media stream with which the in-band metadata was correlated.

For instance, the computing system could transmit the extracted metadata over a broadband network connection to the media client, in message that includes data correlating the extracted metadata with the particular position within the media stream where the in-band metadata was provided.

To facilitate this the computing system and media client could communicate with each other over a broadband network, which could be a packet-switched network such as the Internet. For instance, the media client could sit as a node on a local area network (LAN) at customer premises, with the media client having an assigned Internet Protocol (IP) address on the LAN and the LAN having an IP address on the broadband network. And the computing system could likewise have an IP address enabling the computing system to communicate on the broadband network, such as to provide an out-of-band communication to the media client. The computing system could thus transmit the extracted metadata to the media client in a message according to any agreed communication protocol over the broadband network, among other possibilities.

In an example implementation, the computing system could transmit the extracted metadata out-of-band to the media client in correlation with a particular portion of the media stream by transmitting the extracted metadata to the media client in correlation with one or more digital reference fingerprints that represent one or more particular frames of the media stream. For instance, the computing system could generate or obtain the digital reference fingerprints representing each sequential frame of the media stream that is en route to the media client, and the computing system could transmit those reference fingerprints to the media client on an ongoing basis along with the metadata correlated to particular ones of the reference fingerprints representing the frames with which the metadata was correlated when the metadata was in-band.

Without limitation, digital fingerprinting with respect to video could apply on a per video frame basis and could involve establishing a representation of luminosity and/or other video characteristics. For instance, for a given video frame, a fingerprint generator could programmatically divide the frame into a grid, and the fingerprint generator could measure luminosity of the frame per grid cell and generate a bit string with each bit or series of bits representing luminosity of a respective grid cell, or representing a weighted difference between the luminosity of certain defined pairs of the grid cells, or the like. Further, the fingerprint generator could apply this process continually to generate the digital fingerprint over time as a sequence of fingerprints (as a fingerprint stream). For instance, the fingerprint generator could apply this process to each frame, to each key frame, periodically, or on another defined basis, with each frame's bit string defining a digital fingerprint and/or with a specified hash, combination or series of such bit strings or other representative values defining a digital fingerprint, on a sliding window basis. Other digital fingerprinting mechanisms could be used as well, further including audio fingerprinting.

In a representative implementation, the computing system could correlate a reference fingerprint with particular extracted metadata by attaching the metadata to the reference fingerprint in a data relationship that would be understandable to the media client. For instance, the computing system could establish a data record that contains both the reference fingerprint and the metadata and could send the data record to the media client, so that the media client would receive the reference fingerprint and the associated metadata together. And if the computing system is sending a sequence of reference fingerprints to the media client, the computing might send a sequence of such data records to the media client. As a related example, the computing system might send each reference fingerprint to the media client in the payload portion of a packet, and the computing system might provide the associated extracted metadata, if any, in a header of that packet.

Alternatively, the computing system could use pointers or other data as a basis to correlate reference fingerprints with the particular extracted metadata.

For example, the computing system could use timestamps as a basis to correlate the reference fingerprints with the extracted metadata. In at least this implementation, each of the reference fingerprints that represents a frame of the media stream that is en route to the media client could be timestamped with reference timestamp data indicating the relative time position of the frame represented by the reference fingerprint within the media stream, according to a timeline defined within the media stream or a clock of a content distributor or the like, for instance. Further, the computing system could likewise timestamp each instance of extracted metadata with a reference timestamp indicating the relative time position of the frame with which the metadata was correlated when it was in-band, also according to the same timeline. On an ongoing basis, the computing system could then deliver to the media client both the timestamped metadata and the timestamped reference fingerprints.

Provided with these references fingerprints in correlation with the extracted metadata, the media client could then conveniently reunite (re-correlate) the metadata with one or more frames or other portions of the media stream with which the metadata was correlated when it was in-band.

To do this, the media client could generate digital query fingerprints representing individual frames of the media stream as the media client is presenting the media stream. The media client could apply the same digital fingerprinting process that is used to generate the reference fingerprints provided by the computing system. And the media client could compare those query fingerprints with the provided reference fingerprints in an effort to find fingerprint matches with sufficient certainty.

To compare a given query fingerprint with a given reference fingerprint, the media client could compare corresponding portions of the fingerprints with each other to determine whether the portions match exactly or within defined tolerances. For example, the media client could compute a maximum deviation between the fingerprints and determine if the maximum deviation is within a predefined tolerance. Further, if the fingerprints are binary, this could be a Boolean determination or could involve computing a Hamming distance (as a count of mismatches between respective bit locations in the fingerprints), and if the fingerprints are more complex values, such as decimal values or vectors (e.g., grey values per video frame region), this could involve determining a distance between the values or vectors. Other examples are possible as well.

The media client could specifically conduct this fingerprint matching for at least any reference fingerprint that the computing system provided in correlation with extracted metadata. For each such reference fingerprint, the media client could seek to find a query fingerprint that matches the reference fingerprint. And upon finding a match with sufficient certainty between a query fingerprint representing a frame of the media stream and a reference fingerprint provided by the computing system, the media client could reasonably conclude that the metadata that the computing system provided in correlation with that reference fingerprint corresponds with the frame of the media stream at the media client.

Upon so re-correlating the extracted metadata with the frame of the media stream, the media client could then treat the metadata as though the metadata has been provided expressly in correlation with that frame of the media stream. For instance, if the metadata includes a first instance of an Ad-ID representing a replaceable ad in the media stream, the media client may use that metadata as a basis to start inserting a replaceable ad at that frame in the course of the media client's processing (e.g., playout) of the media stream. Or if the metadata includes an indication of how far ahead in the media stream a content-modification or other action is to occur, the media client could prepare to carry out the action at that upcoming time point in relation to the time point where the metadata was reunited.

In a further implementation, the media client might add back the provided metadata as in-band metadata for reference and use by an entity downstream from the media client. For instance, if the media client is a set top box or other receiver that serves a content presentation device such as a TV, the media client might receive the extracted metadata in the manner described above, and the media client might then steganographically encode that metadata into the media stream in correlation with the associated frame(s) of the media stream. The media client may then output the resulting media stream with steganographically encoded metadata for receipt by the TV. This way, the TV could then decode and read the metadata from the media stream and could take action based on where the metadata was encoded in the media stream.

In the above processes, note that act of the computing system providing the reference fingerprints to the media client could serve additional purposes as well.

For example, providing the reference fingerprints to the media client might facilitate establishing "synchronous lock" of time clocks between the computing system and the media client, such as between a reference-time clock used for reference-fingerprint timestamps at the computing system and a client-time clock used at the media client.

Establishing synchronous lock could be useful in a scenario where the computing system might seek to direct the media client to carry out a content-related action at a particular time point in the media stream, but where the computing system and media client have different perspectives for time. The computing system may characterize the time point in the media stream in the context of a reference timeline, such as a timeline defined along the media stream and/or at a distributor of the media stream. Whereas, the media client may define that time point in the media stream according to a client timeline, such as a timeline defined according to a clock at the media client. This time discrepancy could be because of a broadcast time delay between a media distributor (e.g., over-the-air broadcaster or satellite or cable MVPD) and the media client and/or if the media client is outputting the media stream with time shifting, where the media client received and stored the media stream for later playout and is now outputting the media stream from storage.

In this scenario, the computing system could provide the media client with the reference fingerprints timestamped according to the reference timeline, and the media client could timestamp the query fingerprints according to the client timeline. The media client could then perform fingerprint matching as discussed above. And for each fingerprint match that the media client finds with sufficient certainty, the media client could compute a difference between the reference timestamp of the matching reference fingerprint and the client timestamp of the matching query fingerprint. The media client could then conclude that that computed time difference represents the time offset between reference time and client time, or the media client could conclude that a rolling average (or the like) of such computed time differences represents the time offset between reference time and client time.

If the media client then receives from the computing system a directive to carry out a content-related action at a time point in the media stream characterized according to reference time, then the client could apply the established time offset to translate that reference time point to an associated client time point, and the media client could carry out the content-related action at that client time point. Alternatively, the media client could inform the computing system what time offset the media client has computed, and the computing system could apply that time offset to translate a reference time point to a client time point and could direct the media client to carry out the content-related action at that client time point.

Note also that, in order to facilitate carrying out the processes discussed herein, the computing system may need to initially identify the media stream that the media client is presenting, so that the computing system could then obtain the reference fingerprints of that particular media stream to provide to the media client along with the extracted metadata. The computing system could identify in various ways the media stream that the media client is presenting.

As one example, the media client might regularly generate and transmit to the computing system digital query fingerprints representing frames of the media stream that the media client is presenting. And the computing system might have access to reference fingerprint data that includes reference fingerprints representing each of various different media streams that the media client could possibly be presenting.

In practice, the computing system might receive these reference fingerprints from one or more distributors of the media streams, with capture engines operating at each distributor to generate the reference fingerprints as to each media stream being distributed, and with each reference fingerprint being mapped with a unique identity of the media stream whose frame it represents. Or the computing system might receive copies of each such media stream being distributed and might itself generate the reference fingerprints per media stream, with each reference fingerprint likewise being mapped with a unique identity of the media stream whose frame it represents.

As the computing system receives the query fingerprints from the media client, the computing system could then search through the reference data for reference fingerprints that match the query fingerprints with sufficient certainty. And upon finding with sufficient certainty that the query fingerprints match reference fingerprints representing frames of a particular media stream, the computing system could reasonably conclude that that is the media stream being presented by the media client.

Once the computing system has thus identified the media stream being presented by the media client, the computing system could then specifically obtain the reference fingerprints representing that particular media stream. And the computing system could then proceed with the above process, providing the media client with those reference fingerprints in correlation with metadata that the computing system extracted, to enable the media client to reunite that metadata with the frames of the media stream with which the metadata was correlated when the metadata was in-band.

Further, note that it may be most efficient to carry out the above process of reuniting the extracted metadata with the corresponding frames or other portions of the media stream just in a scenario where the media client is not actually receiving the metadata—such as where the in-band metadata is being stripped or otherwise dropped en route to the media client. To help ensure that the process is carried out in this scenario, as an example implementation, the media client could check whether the media client is receiving the in-band metadata and could inform the computing system one way or the other.

In an example implementation, for instance, the computing system could simply start to carry out the above process, including transmitting out-of-band to the media client the extracted metadata for reuniting with particular frames of the media stream. And when the media client receives that out-of-band-transmitted metadata, the media client could check to determine if the media client also receives the same metadata in-band with the media stream. If so, then the media client could transmit an out-of-band message to the computing system requesting the computing system to discontinue transmitting the extracted metadata to the media client. Whereas, if not, then the media client could proceed to use the provided extracted metadata in the manner discussed above.

Alternatively, the media client could otherwise check to determine if the media client receives in-band metadata and could inform the computing system accordingly to control whether the computing system will go through the process of providing the media client with the extracted metadata. Here, the media client might expect to receive certain in-band metadata and could check to see if it receives that in-band metadata, so as to inform the computing system accordingly.

As a specific example of this, test or dummy metadata could be included in-band with the media stream (e.g., by the media stream provider) specifically for purposes of determining whether the media client receives in-band metadata, and the computing system's extracting of the in-band metadata and providing of the extracted metadata to the media client for reuniting with the associated frames of the media stream could be conditioned on the media client not receiving the test or dummy in-band metadata. If the media client receives the test or dummy in-band metadata, then the media client could inform the computing system of that fact, so that the computing system would then not engage in the process of extracting and providing the metadata as discussed above. Whereas, if the media client does not receive the test or dummy in-band metadata, then the media client could inform the computing system of that fact, so that the computing system would then engage in the process of extracting and providing the metadata as discussed above.

Figure 2:
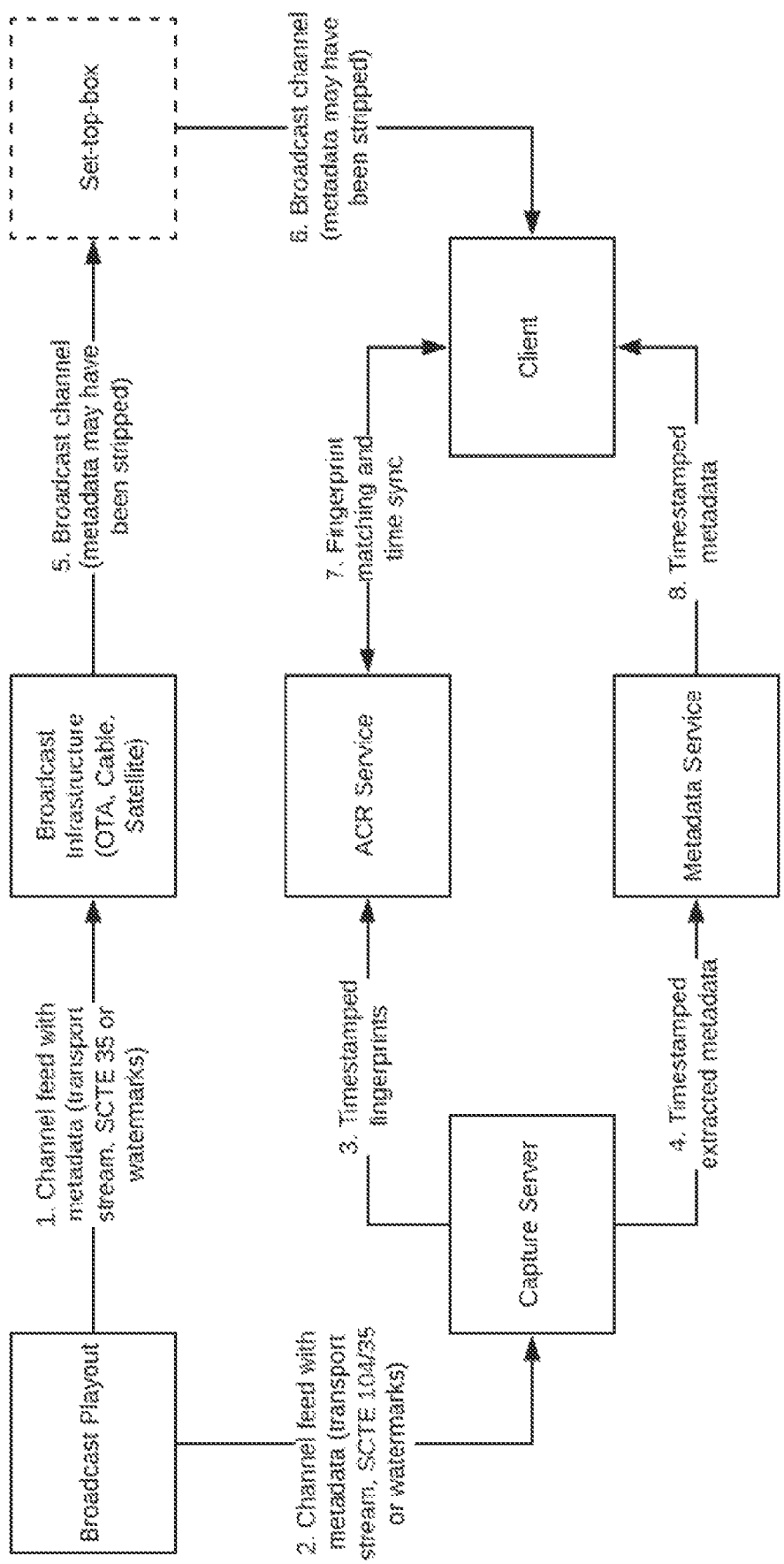
FIG. 2 is a simplified block diagram depicting an example process that could be could be carried out in accordance with the present disclosure.
Figure 3:
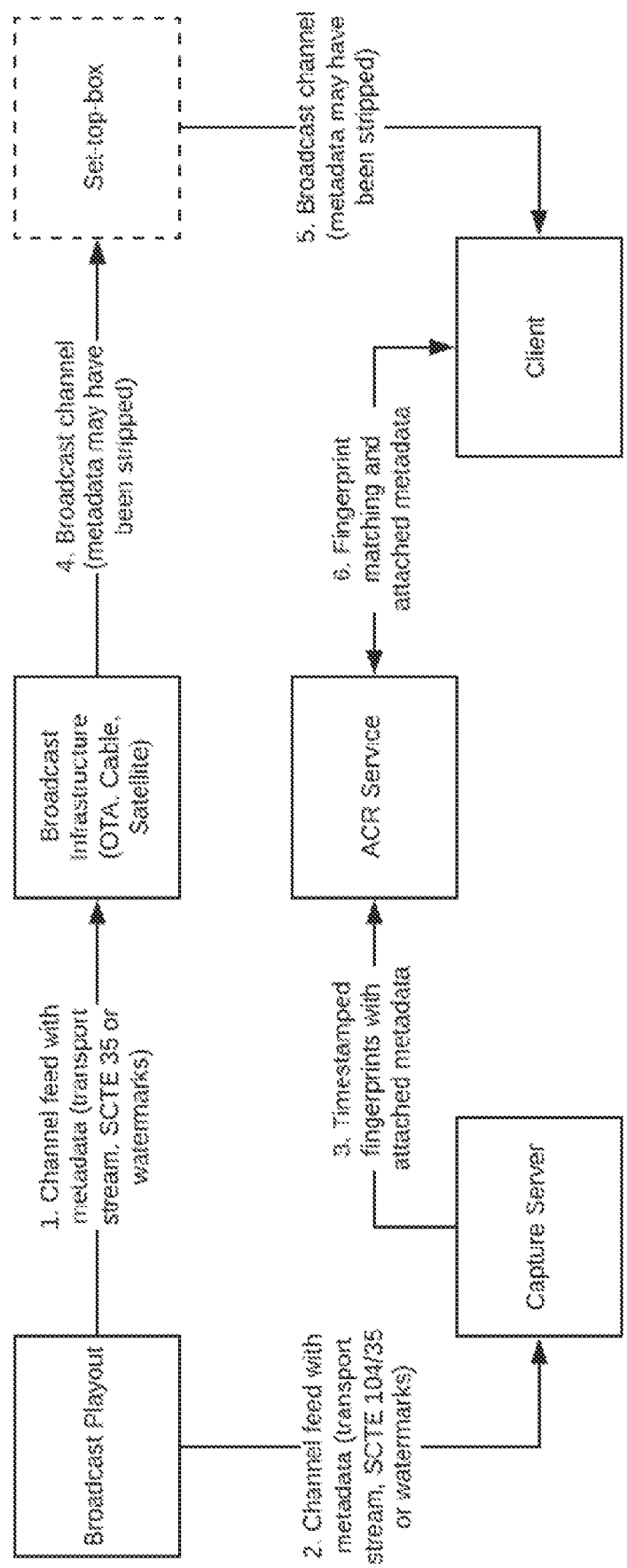
FIG. 3 is another simplified block diagram depicting an example process that could be could be carried out in accordance with the disclosure.

FIGS. 2 and 3 are simplified block diagrams depicting how this process could be carried out in two example scenarios, without limitation.

Each of these figures depicts an example arrangement where a linear channel feed (e.g., a TV channel) passes from a broadcast playout source (broadcast facility) through broadcast infrastructure (e.g., an over-the air, cable) to a media client (e.g., a TV), possibly via a set top box. As shown, the broadcast playout source provides the channel feed together with in-band metadata provided at a transport-stream layer (e.g., SCTE 35 metadata) and/or with watermarking of the channel feed itself. As discussed above, each instance of this in-band metadata would be provided in correlation with a particular content frame or other such portion of the channel feed, Yet as further shown, the metadata may be stripped as it passes through the broadcast infrastructure or elsewhere in the distribution path en route to the media client.

Each figure further shows a capture server that receives from the broadcast playout source a copy of the channel feed with the in-band metadata. This capture server could be a physical device and processing engine at the broadcast facility and/or a remote watching station that is configured to receive a copy of the channel feed with the in-band metadata.

The capture server operates to generate timestamped reference fingerprints of content frames of the channel feed, using any digital fingerprinting process now known or later developed. Further, the capture server operates to extract the in-band metadata provided with the channel feed. And the capture server operates to correlate each instance of extracted metadata with the timestamped reference fingerprint representing a channel feed frame with which the metadata is correlated. For instance, the capture server could attach the metadata with the reference fingerprint in a common data record or the like. Or the capture server could timestamp the metadata with the same timestamp as the reference fingerprint, so that the metadata and reference fingerprint are correlated by having the same timestamp as each other.

FIG. 2 depicts an implementation where the capture server correlates each instance of metadata with the associated reference fingerprint by timestamping the metadata and reference fingerprint with the same timestamp as each other. This implementation includes by way of example an automatic content recognition (ACR) service and a metadata service, which could be server applications executed on separate servers and/or on a common server, possibly integrated with the capture server. With this example arrangement, as the capture server generates the timestamped reference fingerprints and timestamped metadata, the capture server provides the timestamped reference fingerprints to the ACR service and provides the timestamped metadata to the metadata service.

In this example arrangement, as the ACR service receives the of timestamped reference fingerprints, the ACR service provides the timestamped reference fingerprints to the media client. In line with the discussion above, the media client could at the same time generate query fingerprints of the channel feed that the media client receives through the broadcast infrastructure. And the media client could compare the query fingerprints with the reference fingerprints in order to find fingerprint matches with sufficient certainty. As discussed above, one or more such match points could be used as a basis to establish synchronous lock, mapping client time with reference time for instance.

Further, as the metadata service receives the timestamped metadata, the metadata service provides the timestamped metadata to the media client. And in line with the discussion above, the media client could then use the timestamps of the reference fingerprints and the timestamps of the metadata as a basis to reunite the metadata with the frames of the channel feed with which the metadata was correlated when it was in-band. Namely, for each received instance of metadata, the media client could identify a received reference fingerprint that has the same timestamp as the received instance of metadata, and the media client could identify the query fingerprint that the media client deemed to match that identified reference fingerprint. Based on this analysis, the media client could therefore conclude that the received instance of metadata corresponds with the channel-feed frame represented by the identified query fingerprint. And the media client could accordingly use the metadata based on its correlation with that particular frame, in any of the ways discussed above, among other possibilities.

FIG. 3 depicts an implementation where the capture server correlates each instance of metadata with the associated reference fingerprint by attaching the instance of metadata with the reference fingerprint, such as by including them in a common data record for instance. This implementation is shown including an ACR service, which as noted above could be a server application executed on a server, possibly integrated with the capture server. With this example arrangement, as the capture server generates the reference fingerprints with attached metadata, the capture server provides the reference fingerprints with attached metadata to the ACR service.

In this example arrangement, as the ACR service receives the reference fingerprints with attached metadata, the ACR service provides the timestamped reference fingerprints with attached metadata to the media client. And here too, in line with the discussion above, the media client could at the same time generate query fingerprints of the channel feed that the media client receives through the broadcast infrastructure and could compare the query fingerprints with the reference fingerprints in order to find fingerprint matches with sufficient certainty, possibly for purposes of establishing synchronous lock or the like.

Here, as the media client finds a fingerprint match between a query fingerprint and a reference fingerprint with attached metadata, the media client can reunite the metadata with the channel feed frame represented by the query fingerprint as discussed above. And the media client could accordingly use the metadata based on its correlation with that particular frame, in any of the ways discussed above, among other possibilities.

In these implementations, the capture server, ACR service, and possibly metadata service could all form part of a computing system for carrying out the operations described in cooperation with the media client. Further, as discussed above, the computing system might first identify the channel at issue, such as by searching reference data for reference fingerprints that match client-provided query fingerprints. And as also discussed above, the computing system might require, as a condition precedent for carrying out the above operations, that the media client is not receiving in-band metadata, which the computing system might determine in the manner discussed above for instance.

Figure 4:
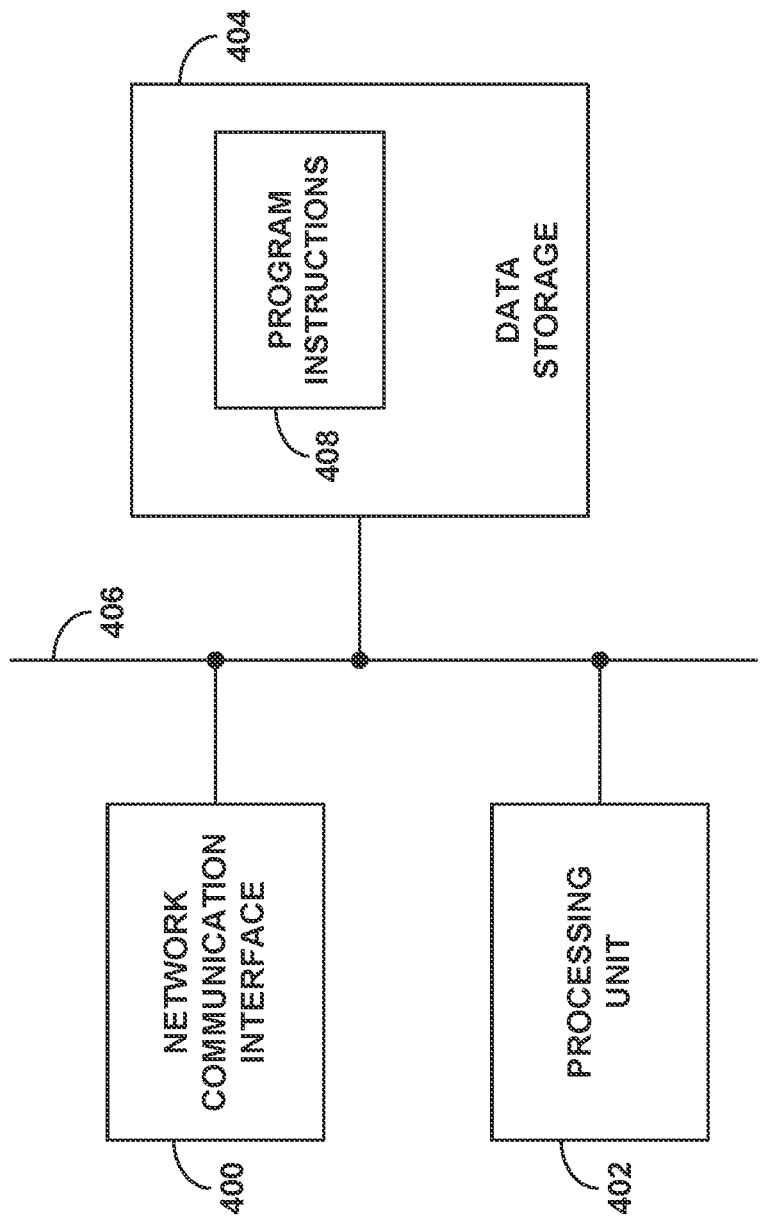
FIG. 4 is a simplified block diagram of an example computing system that could operate in accordance with the disclosure.

FIG. 4 is next a simplified block diagram of a computing system that could operate in accordance with the present disclosure. As shown in FIG. 4, the example computing system includes a network communication interface 400, a processing unit 402, and non-transitory data storage 404, any or all of which could be integrated together or, as shown, communicatively linked together by a system bus, nets pork, or other connection mechanism 406.

The network communication interface 400 could comprise one or more network connection mechanisms to facilitate communication with one or more other entities. Each such network communication interface could comprise a wireless or wired Ethernet interface or other type of network interface, for engaging in IP communication and/or other type of network communication, among other possibilities.

The processing unit 402 could comprise one or more general purpose processors (e.g., microprocessors) and/or one or more specialized processors (e.g., application specific integrated circuits). And the non-transitory data storage 404 could comprise one or more volatile and/or non-volatile storage components, such as optical, magnetic, or flash storage for instance. Further, as shown, the data storage 404 of the example computing system stores or otherwise embodies program instructions 408. These program instructions could be executable by the processing unit 402 to carry out (e.g., to cause the computing system to carry out) various operations described herein.

In line with the discussion above, a representative example of such a computing system could include various modules, such as various services, servers, program modules, or the like, configured to carry out (e.g., to cause the computing system to carry out) various computing-system operations.

For instance, the computing system could include a capture module that is configured to generate reference fingerprint data representing the frame of the media stream and to extract the in-band metadata from the channel feed. Further, the computing system could include one or more modules configured to transmit out-of-band to the media client the generated reference fingerprint data in correlation with the extracted metadata, where the correlation of the extracted metadata with the reference fingerprint data representing the frame of the media stream is useable by the media client as a basis to re-correlate the metadata with the frame of the media stream, so as to enable the media client to carry out an action based on the correlation of the metadata with the frame of the media stream.

Various features discussed herein can be implemented in this context as well, and vice versa.

Figure 5:
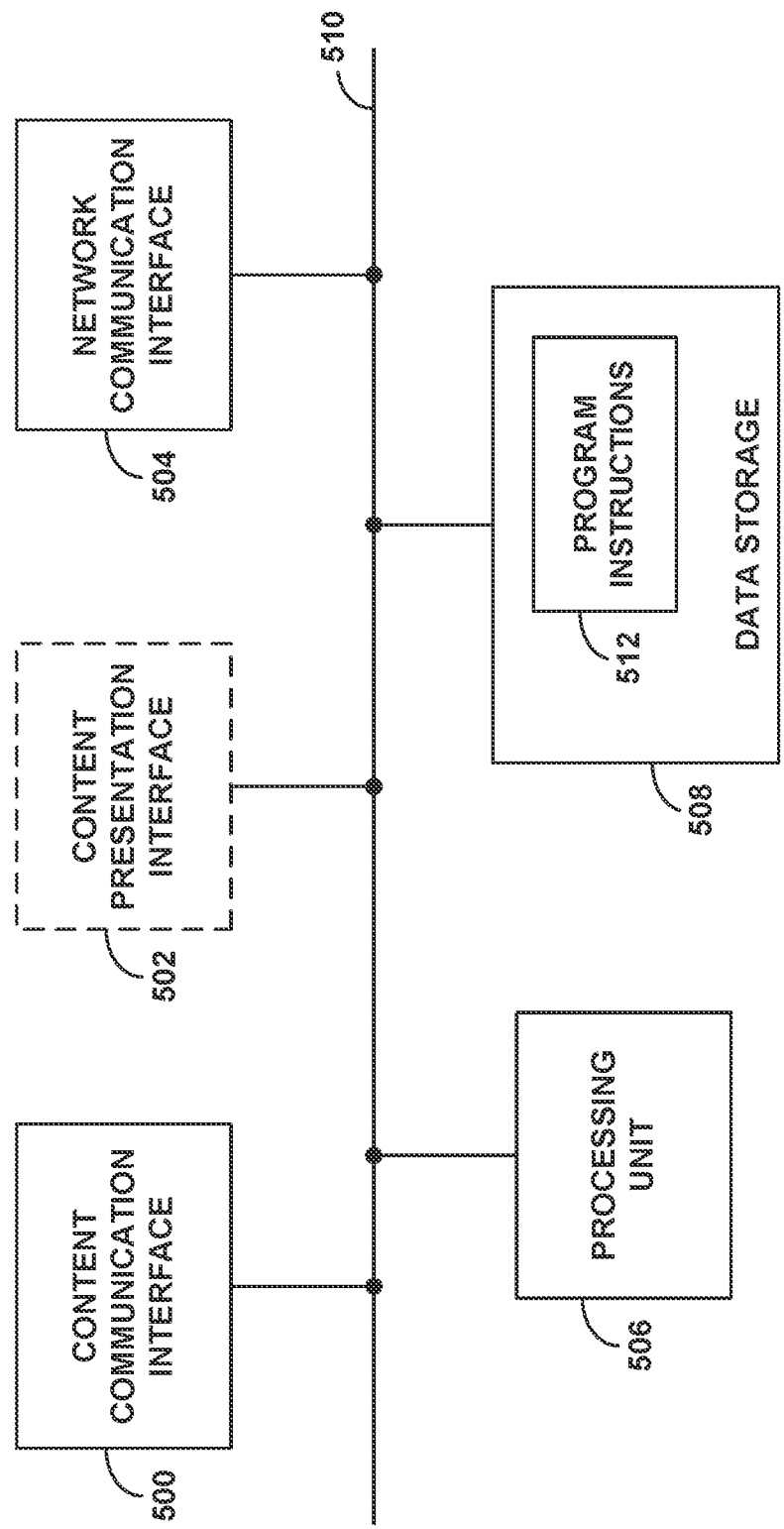
FIG. 5 is a simplified block diagram of an example media client that could operate in accordance with the disclosure.

FIG. 5 is a simplified block diagram of an example media client, operable in accordance with the present disclosure. This media device could take various forms as discussed above, such as a content presentation device 106 and/or a receiver 104, and it could also be a combination of multiple such devices, perhaps a content presentation device having an integrated receiver, among other possibilities.

As shown in FIG. 5, the example media client could include a content communication interface 500, a content presentation interface 502, a network communication interface 504, a processing unit 506, and non-transitory data storage 508, any or all of which could be integrated together or, as shown, communicatively linked together by a system bus, network, or other connection mechanism 510.

Content communication interface 500 could comprise a physical communication interface for receiving and/or outputting media content, such as a media stream. As such, the content communication interface could include one or more wired and/or wireless interfaces for establishing communication with and receiving media content in analog or digital through a media-distribution path and, in some implementations, for outputting received media content in analog or digital form for receipt by an associated entity. Thus, the content communication interface might include interfaces such as coaxial cable connections, antennas, receivers, tuners, or the like, for receiving media content from a content distributor, and local communication interfaces compliant with protocols such as DVI, HDMI, VGA, USB, BLUETOOTH, WIFI, among numerous others for outputting media content to associated devices. Other examples could also be possible.

The content presentation interface 502, which might be included in an end-user content presentation device, could comprise one or more components to facilitate presentation of the received media content. By way of example, the content presentation interface could comprise a user interface such as a display screen and/or a loudspeaker, as well as one or more drivers or other components for processing the received media content to facilitate presentation of the content on the user interface.

The network communication interface 504 could comprise a network connection mechanism to facilitate out-of-band communication on a network, and/or for otherwise engaging in direct or networked communication with one or more other local or remote entities. As such, the network communication interface could comprise a wireless or wired Ethernet interface or other type of network interface, for engaging in IP communication and/or other type of network communication.

The processing unit 506 could then comprise one or more general purpose processors (e.g., microprocessors) and/or one or more specialized processors e.g., application specific integrated circuits). And the non-transitory data storage 508 could comprise one or more volatile and/or non-volatile storage components, such as optical, magnetic, or flash storage. Further, the data storage 508 stores program instructions 512, which could be executable by processing unit 506 to carry out (e.g., to cause the media client to carry out) various operations described herein.

Figure 6:
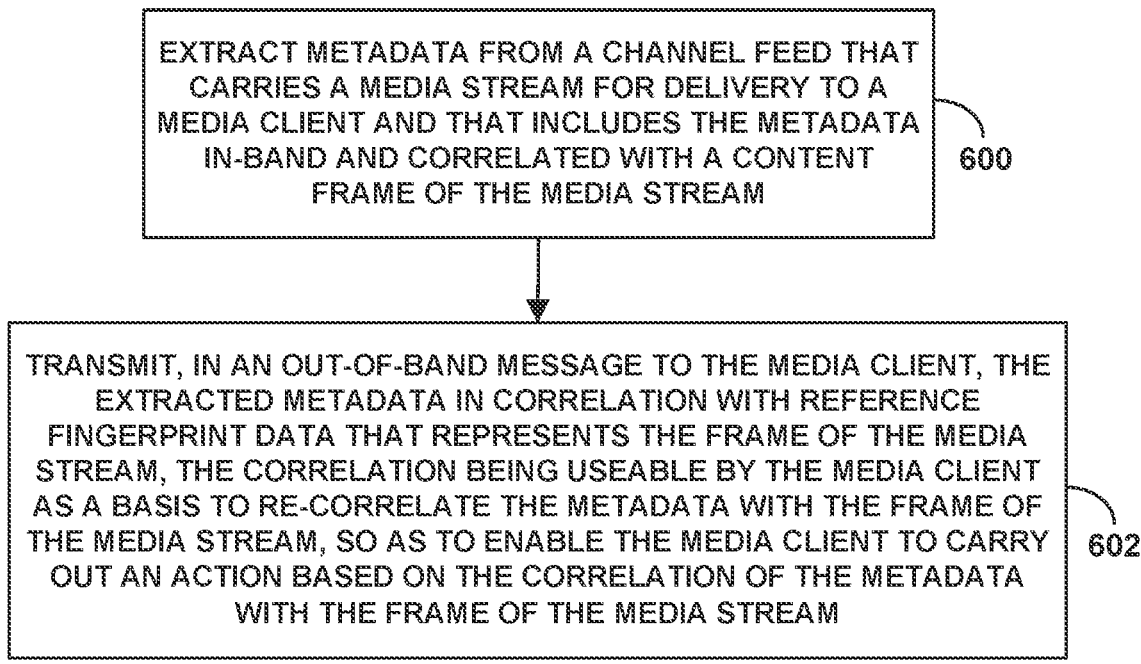
FIG. 6 is a flow chart depicting a method that could be carried out in accordance with the disclosure.

FIG. 6 is next a flow chart depicting an example method that could be carried out in accordance with the present disclosure. This method could be carried out in a communication system in which a channel feed carrying a media stream is broadcast for delivery of the media stream to a media client, and where the channel feed further includes metadata in band and correlated with a content frame of the media stream, but where the metadata gets removed from the channel feed before the media stream reaches the media client.

As shown in FIG. 6, at block 600, the method includes a computing system extracting the metadata from the channel feed that carries the media stream and that includes the metadata in-band and correlated with a content frame of the media stream. And at block 602, the method includes the computing system transmitting, in an out-of-band message to the media client, the extracted metadata in correlation with reference fingerprint data that represents the frame of the media stream, the correlation being useable by the media client as a basis to re-correlate the metadata with the frame of the media stream, so as to enable the media client to carry out an action based on the correlation of the metadata with the frame of the media stream.

In line with the discussion above, the method could additionally involve the computing system determining that the media client does not receive representative metadata with the broadcast channel feed. And the method could involve the computing system carrying out the extracting and transmitting responsive to the determining that the media client does not receive the representative metadata with the broadcast channel feed.

As further discussed above, the act of extracting the metadata from the channel feed could involve extracting the metadata from a copy of the channel feed, the copy being provided before the metadata gets removed from the channel feed. For instance, the channel feed could be provided by a broadcaster, and the computing system could receive the copy of the channel feed from the broadcaster.

As further discussed above, the media stream could take various forms. For instance, the media stream could comprise a television channel.

Further, as discussed above, the channel feed could include the metadata in-band in various ways. For instance, the channel feed could include the metadata carried in a transport stream that also carries the media stream, and/or the channel feed could include the metadata in the media stream itself, such as watermarked in the media stream and/or, if the media stream includes video frames, carried in a vertical ancillary data space of a video frame of the media stream, among other possibilities.

Still further, as discussed above, the act of transmitting to the media client the extracted metadata in correlation with reference fingerprint data representing the frame of the media stream could involve transmitting to the media client the extracted metadata timestamped with a reference timestamp and transmitting to the media client the reference fingerprint data timestamped with the same reference timestamp. Alternatively or additionally, the act of transmitting to the media client the extracted metadata in correlation with reference fingerprint data representing the frame of the media stream could involve transmitting to the media client the extracted metadata attached with the reference fingerprint data.

Yet further, as discussed above, the media client could use the correlation of the extracted metadata with the reference fingerprint data representing the frame of the media stream as a basis to re-correlate the metadata with the frame of the media stream, so as to enable the media client to carry out a content-related action based on the correlation of the metadata with the frame of the media stream. And the content-related action could take various forms, such as but not limited to dynamic ad insertion.

Where the present disclosure refers to individual devices, servers, modules, or other entities, the disclosure also contemplates the possibility of each such entity being a single entity or being a combination of multiple entities. For instance, a given entity could comprise a platform or system including multiple devices configured to interwork together or to operate separately or in another manner.

The present disclosure also contemplates one or more computer readable media being encoded with, storing, or otherwise embodying program instructions executable by a processing unit (e.g., one or more processors) to carry out various described operations.

Exemplary embodiments have been described above. Those skilled in the art will understand, however, that changes and modifications may be made to these embodiments without departing from the true scope and spirit of the invention.

What is claimed is:

1. A computer-implemented method, comprising:
   determining, by at least one computer processor, that metadata associated with a content frame of a media stream intended for a media client is removed from a channel feed before the media stream reaches the media client;
   extracting the metadata from a copy of the channel feed; and
   transmitting in an out-of-band message to the media client, the extracted metadata in correlation with reference fingerprint data representing the content frame of the media stream, wherein the correlation of the extracted metadata with the reference fingerprint data representing the content frame of the media stream enables the media client to re-correlate the metadata with the content frame of the media stream for carrying, out an action based on the correlation of the metadata with the content frame of the media stream.

2. The computer-implemented method of claim 1, wherein said extracting and said transmitting are performed responsive to determining that the metadata associated with the content frame of the media stream intended for the media client is removed from the channel feed before the media stream reaches the media client.

3. The computer-implemented method of claim 1, wherein the copy is received before the metadata is removed from the channel feed.

4. The computer-implemented method of claim 3, wherein the copy of the channel feed is received from a broadcaster.

5. The computer-implemented method of claim 1, wherein the media stream comprises a television channel.

6. The computer-implemented method of claim 1, wherein the extracting of the metadata from the copy of the channel feed comprises reading the metadata from a transport stream that carries the media stream.

7. The computer-implemented method of claim 1, wherein the extracting of the metadata from the copy of the channel feed comprises reading the metadata based on watermarking embedded into the media stream.

8. The computer-implemented method of claim 1, wherein the extracting of the metadata from the copy of the channel feed comprises reading the metadata from a vertical ancillary data space of a video frame of the media stream.

9. The computer-implemented method of claim 1, wherein transmitting to the media client the extracted metadata in correlation with the reference fingerprint data representing the content frame of the media stream comprises transmitting to the media client the extracted metadata timestamped with a reference timestamp and transmitting to the media client the reference fingerprint data timestamped with the same reference timestamp.

10. The computer-implemented method of claim 1, wherein transmitting to the media client the extracted metadata in correlation with the reference fingerprint data representing the content frame of the media stream comprises transmitting to the media client the extracted metadata attached with the reference fingerprint data.

11. The computer-implemented method of claim 1,
   wherein the action carried out by the media client based on the correlation of the metadata with the content frame of the media stream comprises a content-related action, and
   wherein the media client uses the correlation of the extracted metadata with the reference fingerprint data representing the content frame of the media stream as a basis to re-correlate the metadata with the content frame of the media stream, so as to enable the media client to carry out the content-related action based on the correlation of the metadata with the content frame of the media stream.

12. The computer-implemented method of claim 1, wherein the action carried out by the media client based on the correlation of the metadata with the frame of the media stream comprises dynamic ad insertion.

13. A system, comprising:
   one or more memories; and
   at least one processor each coupled to at least one of the one or more memories and configured to perform operations comprising:
      determining that metadata associated with a content frame of a media stream intended for a media client is removed from a channel feed before the media stream reaches the media client;
      extracting the metadata from a copy of the channel feed; and
      transmitting, in an out-of-band message to the media client, the extracted metadata in correlation with reference fingerprint data representing the content frame of the media stream, wherein the correlation of the extracted metadata with the reference fingerprint data representing the content frame of the media stream enables the media client to re-correlate the metadata with the content frame of the media stream for carrying out an action based on the correlation of the metadata with the content frame of the media stream.

14. The system of claim 13, wherein said extracting and said transmitting are performed responsive to determining that the metadata associated with the content frame of the media stream intended for the media client is removed from the channel feed before the media stream reaches the media client.

15. The system of claim 13, wherein the extracting of the metadata from the copy of the channel feed comprises reading the metadata from a transport stream that carries the media stream.

16. The system of claim 13, wherein the extracting of the metadata from the copy of the channel feed comprises reading the metadata based on watermarking embedded into the media stream.

17. The system of claim 13, wherein transmitting to the media client the extracted metadata in correlation with the reference fingerprint data representing the content frame of the media stream comprises transmitting to the media client the extracted metadata timestamped with a reference timestamp and transmitting to the media client the reference fingerprint data timestamped with the same reference timestamp.

18. The system of claim 13, wherein transmitting to the media client the extracted metadata in correlation with the reference fingerprint data representing the content frame of the media stream comprises transmitting to the media client the extracted metadata attached with the reference fingerprint data.

19. The system of claim 13, wherein the action carried out by the media client based on the correlation of the metadata with the frame of the media stream comprises dynamic ad insertion.

20. A non-transitory computer-readable medium having instructions stored thereon that, when executed by at least one computing device, cause the at least one computing device to perform operations comprising:
    determining, by at least one computer processor, that metadata associated with a content frame of a media stream intended for a media client is removed from a channel feed before the media stream reaches the media client;
    extracting the metadata from a copy of the channel feed; and
    transmitting in an out-of-band message to the media client, the extracted metadata in correlation with reference fingerprint data representing the content frame of the media stream, wherein the correlation of the extracted metadata with the reference fingerprint data representing the content frame of the media stream enables the media client to re-correlate the metadata with the content frame of the media stream for carrying out an action based on the correlation of the metadata with the content frame of the media stream.

* * * * *